United States Patent
Budinger et al.

(10) Patent No.: US 8,461,505 B2
(45) Date of Patent: Jun. 11, 2013

(54) SYSTEMS AND METHODS FOR INTERIOR SURFACES IMAGE ILLUMINATION HAVING DUAL PROJECTOR

(75) Inventors: Tilo Budinger, Hamburg (DE); Carsten Vogel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 565 days.

(21) Appl. No.: 12/702,901

(22) Filed: Feb. 9, 2010

(65) Prior Publication Data
US 2010/0201951 A1    Aug. 12, 2010

Related U.S. Application Data

(60) Provisional application No. 61/150,972, filed on Feb. 9, 2009.

(30) Foreign Application Priority Data

Feb. 9, 2009 (DE) .......................... 10 2009 008 084

(51) Int. Cl.
 *H01L 27/00* (2006.01)
(52) U.S. Cl.
 USPC .......................................... 250/208.1; 353/13
(58) Field of Classification Search
 USPC .................. 250/208.1, 205, 239; 353/13, 29, 353/30, 94, 119; 362/471
 See application file for complete search history.

(56) References Cited

U.S. PATENT DOCUMENTS

| 6,814,443 B2 * | 11/2004 | Safran et al. ................... 353/30 |
| 6,814,448 B2 * | 11/2004 | Ioka ................................. 353/69 |
| 2011/0095911 A1 * | 4/2011 | Babst et al. ................... 340/945 |

FOREIGN PATENT DOCUMENTS

| DE | 102007008164 A1 | 8/2008 |
| DE | 102007023344 A1 | 12/2008 |

OTHER PUBLICATIONS

German Patent and Trade Mark Office, German Office Action for German Patent Application No. 10 2009 008 084.8, mailed Jan. 29, 2013.

* cited by examiner

*Primary Examiner* — Que T Le
(74) *Attorney, Agent, or Firm* — Ingrassia Fisher & Lorenz P.C.

(57) ABSTRACT

An image generating illumination device is provided for interior surfaces of a means of transport. The illumination device includes, but is not limited to at least one or several projection units and a light-emitting diode arrangement. The projection units are designed to project a continuous image onto the surface of hat racks that are arranged one beside the other, and the light-emitting diode arrangement is designed to illuminate ceiling panels. The light that is projected by the light-emitting diode arrangement merges seamlessly into the continuous image.

14 Claims, 3 Drawing Sheets

SYSTEMS AND METHODS FOR INTERIOR SURFACES IMAGE ILLUMINATION HAVING DUAL PROJECTOR

CROSS-REFERENCE TO RELATED APPLICATIONS

This application claims the benefit of the filing date of German application 102009008084.8 filed on Feb. 9, 2009 and of U.S. Provisional Patent Application No. 61/150,972 filed on Feb. 9, 2009, the disclosures of which applications are hereby incorporated herein by reference.

TECHNICAL FIELD

The invention relates to the image generating illumination of interior surfaces. In particular, the invention relates to an image generating illumination device for interior surfaces of a means of transport, to an aircraft comprising an illumination device, to a method for projecting images and illumination effects onto interior surfaces, to a program element and to a computer-readable medium.

BACKGROUND

In commercial aircraft, and in particular in long-range aircraft, it is desirable to design the cabin so that passengers' time on board is made more agreeable. This can, for example, be achieved in that the light color, color temperature or illumination intensity are varied in a time-controlled manner so that the impression of a virtual progression of a day arises. In this way, the loss of the real sense of time can be compensated for, and perceptions can be created that have a positive influence on the internal clock.

From DE 10 2007 008 164 A1 a method and a device for adapting edge region illumination to image presentation on an interior surface of an aircraft is known, in which method and device a multitude of projectors are used in order to give viewers the impression of a large and continuous image.

Furthermore, in the passenger cabins, illuminated signs are provided which indicate, for example, emergency exits.

SUMMARY

Stated are an image generating illumination device (also called illumination arrangement) for interior surfaces of a means of transport, an aircraft comprising such an illumination device, a method for projecting images and illumination effects onto interior surfaces of an aircraft, a program element as well as a computer-readable medium.

The exemplary embodiments described relate equally to the illumination device, the aircraft, the method, the program element and the computer-readable medium. In other words, the characteristics and features, stated presently and below, of the illumination device can also be implemented as method-related steps in the method, the program element and the computer-readable medium and vice versa.

According to an exemplary embodiment, an image generating illumination device (or arrangement) for interior surfaces of a means of transport is stated, which illumination device comprises a first projection unit, a second projection unit and a light-emitting diode arrangement with several light emitting diodes. The two projection units are designed to project a continuous image onto a first interior surface of the means of transport. The light-emitting diode arrangement is designed to illuminate a second interior surface of the means of transport.

This may improve illumination in aircraft, which illumination is characterized by good flexibility, a requirement for little space, as well as modest installation effort.

By integrating several projection units and light emitting diodes in the illumination device a complex image generating illumination device may be provided, which in a simple manner may be integrated as an individual component in the cabin, above a hat rack, of an aircraft. The illumination device may be able to project continuous images, which after projection are undistorted, onto correspondingly curved interior surfaces of the means of transport. At the same time other interior surfaces of the means of transport may be illuminated by the light emitting diodes.

In this way a complex image light pattern may be represented, by means of which extensive information can be conveyed to passengers.

For example, in this way day/night scenarios can be imitated. Furthermore, it may be possible to facilitate and speed up boarding and de-planing because the illumination device can be used for guiding passengers. For example, the projection units can project directional information so that in emergency situations too passengers know where to find the nearest exit. Furthermore, seating information can be projected onto the interior surfaces of the corresponding interior furnishings or equipment in order to speed up the boarding procedure.

According to a further exemplary embodiment, the first interior surface is a surface of one or several adjacent ha tracks.

According to a further exemplary embodiment, the second interior surface is a surface of one or several ceiling panels.

According to a further exemplary embodiment, the illumination device comprises a calculation unit (also called arithmetic unit or processor) as well as a first interface. The first interface is used to connect the illumination device to a databus, e.g., of the cabin management system, for transmitting control data to the arithmetic unit. The arithmetic unit is designed for controlling the two projection units and the light-emitting diode arrangement on the basis of the control data.

Furthermore, according to a further exemplary embodiment, the illumination device comprises a storage device for storing control data, e.g. image data or film data, for controlling the two projection units and the light-emitting diode arrangement.

The control data can thus on the one hand be transmitted by way of the databus. On the other hand the control data can also, for example, be transmitted to the illumination device by way of a portable storage device that receives the control data from a terrestrial computer.

According to a further exemplary embodiment, the illumination device comprises an end face with a length L. The first projection unit is arranged on the end face at a position L/4 (i.e., a quarter of L), and the second projection unit is arranged on the end face at a position 3L/4 (i.e., three quarters of L).

In other words, in each case the two projection units are arranged at a distance beside the ends of the illumination device, which distance corresponds to a quarter of the overall length of the illumination device.

According to a further exemplary embodiment, the illumination device comprises a top, wherein the light-emitting diode arrangement is arranged at the top.

According to a further exemplary embodiment, the means of transport is an aircraft.

However, the means of transport can also be a watercraft, a rail vehicle or a land vehicle.

According to a further exemplary embodiment, the illumination device comprises a housing in which the two projection units and the light-emitting diode arrangement are integrated.

In this arrangement the housing can be designed so as to be modular so that it can easily be connected to other such housings. To this purpose the housing comprises a second interface, wherein the illumination device is designed for modular expansion, and the second interface is used for connection to a further illumination device.

In other words, several such illumination devices can be connected to each other in a simple manner so that the entire length of the cabin can be illuminated.

This may require only a modest installation effort. It is sufficient for one of the illumination devices to comprise an arithmetic unit and a storage device, because the remaining illumination devices can be connected to this central arithmetic unit and the central storage device by way of the (second) interfaces.

According to a further exemplary embodiment, an aircraft with a passenger cabin and an illumination device described above and below is stated.

According to a further exemplary embodiment, the aircraft further comprises a cabin management system for connection to the illumination device and for the transmission of control data to the illumination device.

According to a further exemplary embodiment, a method for projecting images and illumination effects onto interior surfaces of an aircraft is stated, in which method a continuous image is projected onto a first interior surface of the aircraft by means of at least two projectors and, furthermore, illumination of a second interior surface of the aircraft takes place by means of a light-emitting diode arrangement comprising several light emitting diodes.

According to a further exemplary embodiment, the method comprises the following further steps: distorting the continuous image such that on a curved projection surface it appears undistorted; and controlling the light-emitting diode arrangement such that the light that is projected by the light-emitting diode arrangement onto the second interior surface merges seamlessly into the continuous image.

According to a further exemplary embodiment, a program element is stated which when it is executed on a processor instructs the processor to carry out the steps described above and below.

According to a further exemplary embodiment, a computer-readable medium is stated, on which a program element is stored which when it is executed on a processor instructs the processor to carry out the steps described above and below.

Below, exemplary embodiments are described with reference to the drawings.

BRIEF DESCRIPTION OF THE DRAWINGS

The present invention will hereinafter be described in conjunction with the following drawing figures, wherein like numerals denote like elements.

The illustrations in the figures are diagrammatic and not to scale. In the following description of the figures the same reference characters are used for identical or similar elements.

DETAILED DESCRIPTION

Figure 1:
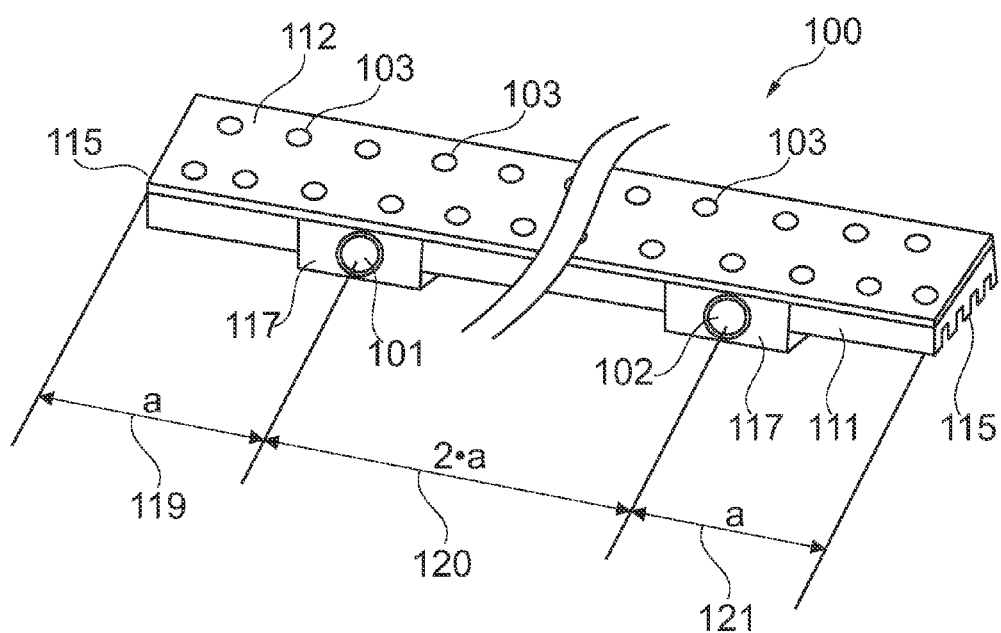
FIG. 1 shows a perspective view of an illumination device according to an exemplary embodiment.

FIG. 1 shows an illumination device 100 comprising a first projection unit 101, a second projection unit 102 and a light-emitting diode arrangement 103. The light-emitting diode arrangement 103 is integrated in the top cover 112 of the illumination device and in this embodiment 23 comprises individual light emitting diodes. However, it is also possible for more or fewer light emitting diodes to be provided. The illumination device 100 is not shown in its full length. Instead, in the middle, a section has been removed for ease of presentation.

The two projection units 101, 102 are arranged on the end face 111 of the illumination device 100; they each comprise a front cover 117 that projects somewhat from the surface of the end face 111.

The right-hand and left-hand sidewalls 115 of the illumination device 100 comprise downward pointing indentations. This is a heat sink that is arranged underneath the LED unit 103 for the purpose of removing heat. This heat sink is interrupted in the region of the projection units 101, 102 and comprises connecting faces in order to also remove heat from the projection units.

As shown in FIG. 1, in each case the distances between the two projection units 101, 102 and the end regions of the illumination device 100 are a quarter of the entire length of the illumination device. This is indicated by the arrows 119 (length a), 120 (length 2a) and 121 (length a).

By means of the illumination device according to the invention it is not only possible to provide decorative and representative illumination that enhances passenger comfort, but entire images can be projected in various projection directions. Due to corresponding image processing it is possible to provide distortion-free projection of the images onto curved surfaces. At the same time as image projection, it is also possible to project illumination effects, for example onto the cabin ceiling.

The light emitting diodes 103 are white or colored LEDs that can be used as the sole illumination means in the aircraft cabin.

If full-colored LED illumination devices are used in the light diode arrangement, it is possible not only to illuminate the cabin but also to project decorative illumination ambiance images onto the ceiling panels and the sidewall panels. By means of the image generating illumination device 100 the illumination ambiance images on the ceiling panels are combined with image- and animation presentations on the hat racks. It is possible, for example, to represent clouds, the path of the sun, the path of stars, or horizons of various types, as well as informative contents such as advertising or cabin information. This information presented merges seamlessly into the illumination ambiance image of the ceiling panel and generates a uniform image.

In this way a considerable enhancement of passenger comfort is achieved. Furthermore, the illumination device makes it possible to provide additional options in the portraying illumination, for example creating colored cabin zones for improved orientation during boarding. This does not require a high ceiling, because the illumination device is specially designed for the cabin configuration with hat racks in the middle of the cabin.

The image generating illumination device 100 can be thought of as a LED illumination device with a fully integrated Pico-LED projection unit. The device comprises white LEDs as well as a combination of colored LEDs, e.g., red, green and blue LEDs or red, green, blue and orange or yellow (amber) LEDs, in various ratios of the individual number. The two integrated projection units are in each case positioned by one quarter of the overall length of the device from the lateral ends of the device (see FIG. 1).

Each one of the projection units comprises a LED illumination source, an image generating chip (Digital Light Processor, DLP or Liquid Crystal on Silicon, LCoS) as well as focusing optics.

The voltage supply to the LEDs for illumination as well as for the projection units is by means of an electronic power pack 307 (see FIG. 3) that is connected to the on-board supply network of the aircraft. The electronic unit 108 for image processing is also integrated in the shared lighting electronics. In this arrangement an interface 109 can be used to transmit the image elements and animation elements by way of the cabin management system 301. As an alternative, a local storage medium can be used by way of the device interface 122 on the illumination device 100 in order to store the image elements and animation elements.

The image generating illumination device is integrated in the usual installation locations of the standard illumination devices above the hat racks. The multi-colored LEDs generate the illumination ambiance on the ceiling panel, wherein the projection units project the image or animation element onto the respective opposite half of the hat rack. The laterally adjacent half of the hat rack is covered by the second projection unit of the illumination device. The generated image element or animation element is a through-image on the hat racks along the length of the cabin; said image element or animation element is pre-produced, outside the aircraft, in the method described below.

The image elements and animation elements are pre-produced outside the aircraft cabin in the required format (corresponding to the area of the hat rack front) and are either transmitted to the illumination device (and thus to the projection units) by means of the cabin management system, or are locally stored on a storage element in the illumination device and are played directly.

Furthermore, for matching the LED illumination to the imaging element and animation element, the so-called pixel mapper method is used. This method is described in DE 10 2007 008 164 A1. This involves illumination matching to image representation on surfaces of vehicle interiors.

Figure 2:
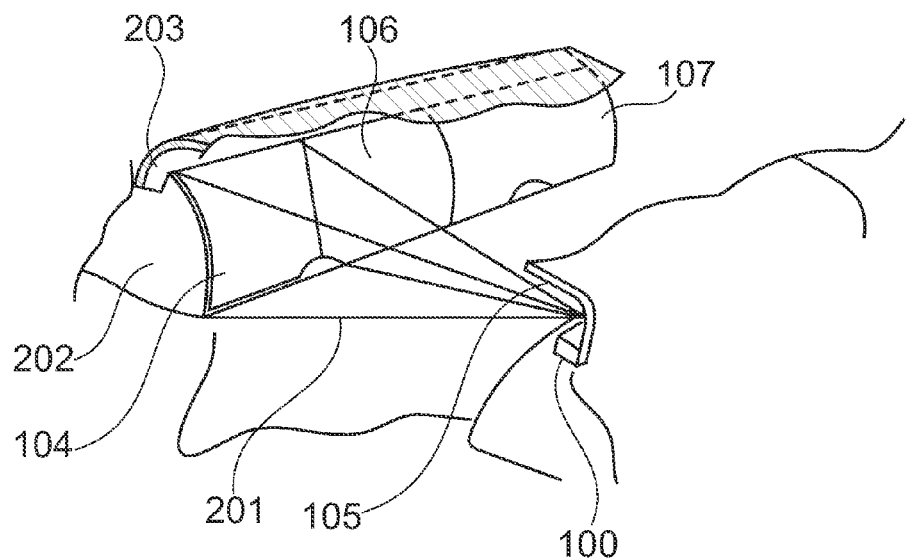
FIG. 2 shows hat racks in an aircraft cabin with an illumination device according to an exemplary embodiment.

FIG. 2 shows light 201 emitted from the illumination device 100 projected onto a surface 107 of a chain of hat racks 202. A ceiling panel 203 can be positioned adjacent to the chain of hat racks 202.

Figure 3:
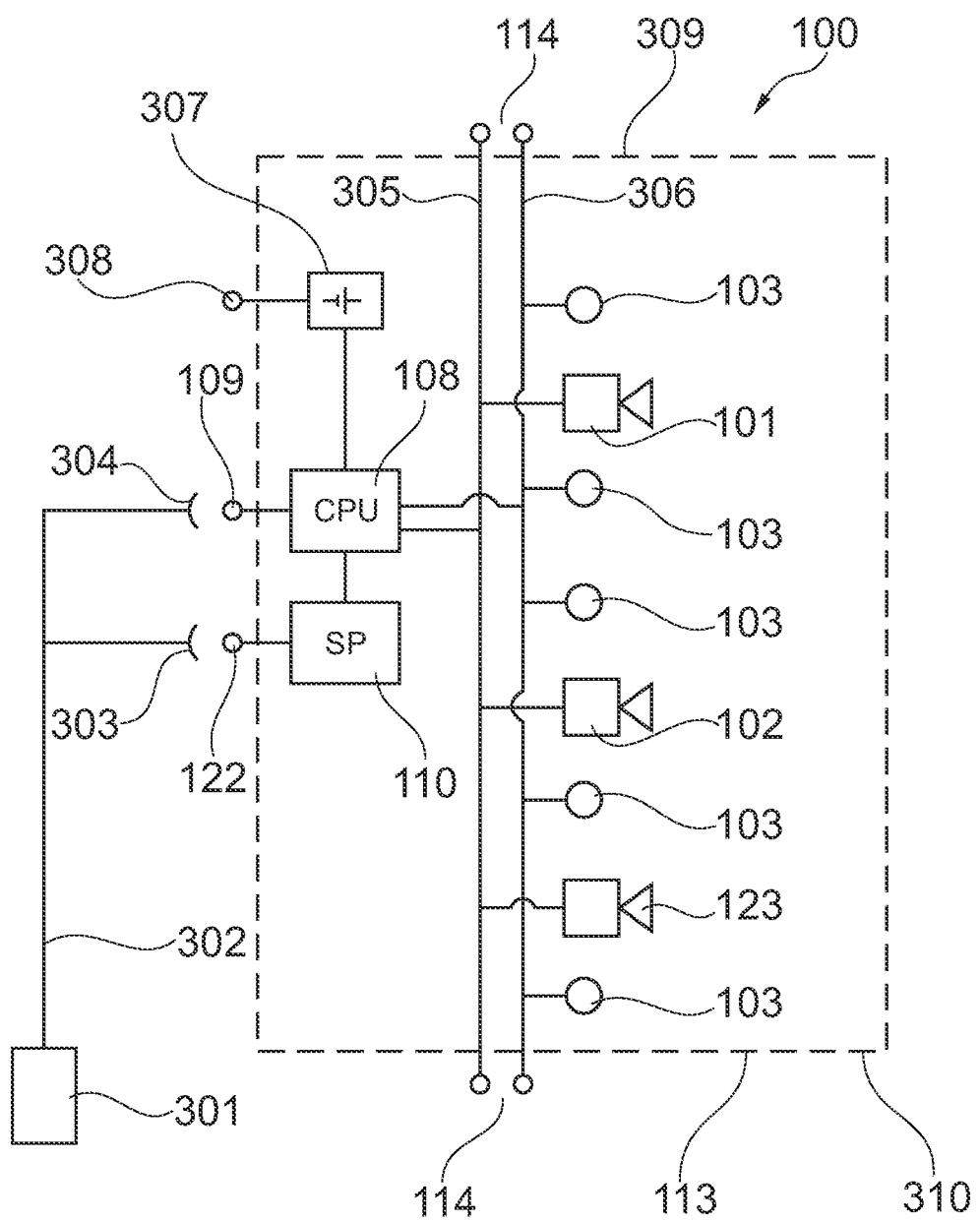
FIG. 3 shows a view of various elements of the illumination device, as well as of a control device connected thereto, according to an exemplary embodiment.

FIG. 3 shows a diagrammatic view of an illumination device 100 that is connected to a control unit 301 in the aircraft. By way of the databus 302, data from the control unit 301 can be transmitted to the arithmetic unit 108 of the illumination device 100 by way of the bus interface 304 and the device interface 109, or can be transmitted to an internal storage device 110 by means of the bus interface 303 and the device interface 122.

It is also possible to connect an external storage medium to the storage device 110 by way of the device interface 122.

The electronic power pack 307 can be connected to the on-board supply network of the aircraft by way of the device interface 308, with said electronic power pack 307 being connected to the arithmetic unit 108.

The arithmetic unit 108 controls the various projection units 101, 102, 123 by way of a first databus 305. Furthermore, the arithmetic unit 108 controls the various light emitting diodes 103 by way of a second databus 306 or by way of separate control lines and supply lines.

It should be pointed out that FIG. 3 merely shows a schematic diagram. In particular, further control lines or supply lines may be provided.

Additional interfaces 114 are provided on the two sides 309, 310 of the illumination device 100, to which interfaces 114 further illumination devices 100 can be connected.

Figure 4:
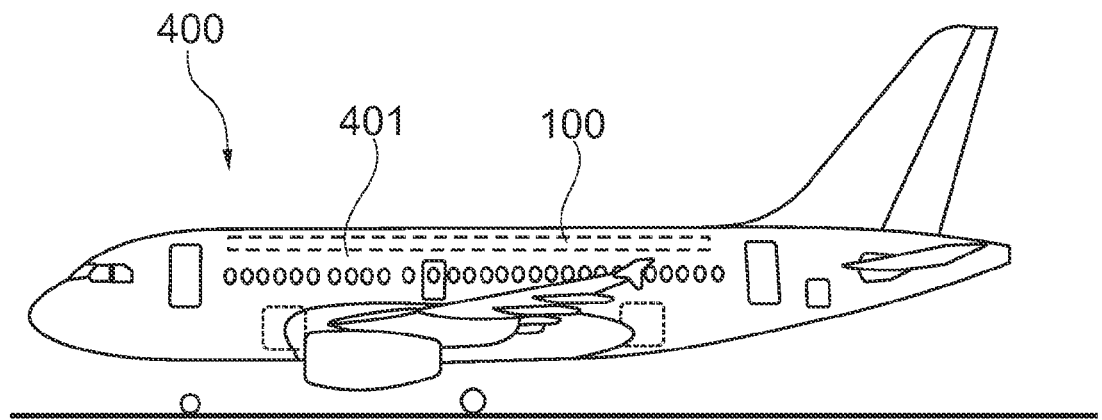
FIG. 4 shows an aircraft according to an exemplary embodiment.

FIG. 4 shows an aircraft 400 with a passenger cabin 401 and an illumination device 100 described above.

Figure 5:
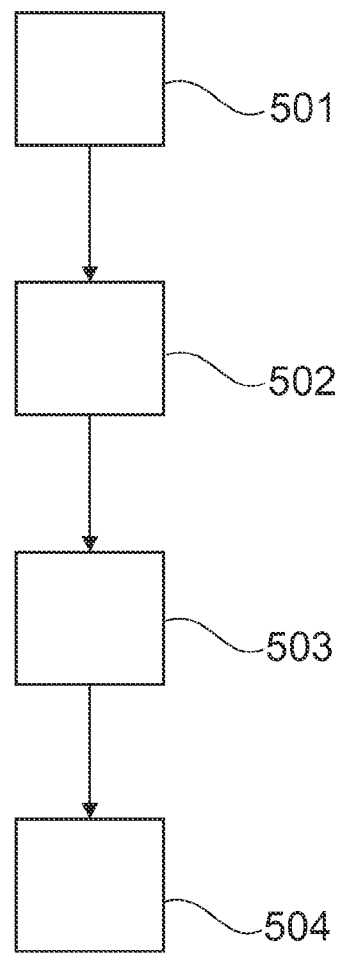
FIG. 5 shows a flow chart of a method according to an exemplary embodiment.

FIG. 5 shows a flow chart of a method in which in step 501 projection data is distorted such that a corresponding image that is projected onto a curved projection surface appears undistorted. In step 502 a light-emitting diode arrangement comprising several light emitting diodes is controlled such that light is projected onto a further interior surface of the aircraft cabin.

In step 503, projection of a continuous image onto a first interior surface of the aircraft takes place by means of several projectors. This interior surface is, for example, the surface of hat racks that are arranged one beside the other. In step 504 illumination of the second interior surface of the aircraft (for example one or several ceiling panels) takes place by means of the light-emitting diode arrangement, wherein the light projected by the light-emitting diode arrangement merges seamlessly into the continuous image.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An image generating illumination device for interior surfaces of a means of transport, with the image generating illumination device comprising:
   a housing with a top region;
   a first projection unit disposed in the housing;
   a second projection unit disposed in the housing; and
   a light-emitting diode arrangement comprising several light emitting diodes arranged in the top region of the housing,
   wherein the first projection unit and the second projection unit are designed to project a continuous image onto a first interior surface of the cabin of the means of transport, and wherein the light-emitting diode arrangement is designed to illuminate a second interior surface of the cabin of the means of transport, the second interior surface arranged above the first interior surface.

2. The image generating illumination device of claim 1, wherein the first interior surface is a surface of two adjacent hat racks.

3. The image generating illumination device of claim 1, wherein the second interior surface is a surface of at least one ceiling panel.

4. The image generating illumination device of claim 1, further comprising:
   a calculation unit; and
   a first interface for connection to a databus for transmitting control data to the calculation unit,
   wherein the calculation unit is designed for controlling the first projection unit and the second projection unit and the light-emitting diode arrangement a basis of the control data.

5. The image generating illumination device of claim 1, further comprising a storage device for storing control data for controlling the first projection unit and the second projection unit and the light-emitting diode arrangement.

6. The image generating illumination device of claim 1, wherein the image generating illumination device comprises an end face with a length L, wherein the first projection unit is arranged on the end face on a position L/4, and wherein the second projection unit is arranged on the end face at a position 3L/4.

7. The image generating illumination device of claim 1, wherein the image generating illumination device comprises a housing for integration of the first projection unit and the second projection unit and the light-emitting diode arrangement.

8. The image generating illumination device of claim 1, further comprising a second interface, wherein the image generating illumination device is designed for being modularly expanded, and the second interface is used for connection to a further image generating illumination device.

9. An aircraft, comprising:
   a passenger cabin; and
   an image generation illumination device for interior surfaces of the passenger cabin, the image generation illumination device comprising:
      a housing with a top region;
      a first projection unit disposed in the housing;
      a second projection unit disposed in the housing; and
      a light-emitting diode arrangement comprising several light emitting diodes arranged in the top region of the housing,
      wherein the first projection unit and the second projection unit project an image onto a first interior surface of the passenger cabin of the aircraft, and
      wherein the light-emitting diode arrangement illuminates a second interior surface of the passenger cabin of the aircraft, the second interior surface arranged above the first interior surface within the passenger cabin.

10. The aircraft of claim 9, further comprising a cabin management system connected to the image generating illumination device and for transmission of control data to the image generating illumination device.

11. A method for projecting images and illumination effects onto interior surfaces of an aircraft cabin, comprising:
   projecting a continuous image onto a first interior surface of the aircraft cabin by means of at least two projectors; and
   illuminating a second interior surface of the aircraft cabin arranged above the first interior surface by means of a light-emitting diode arrangement comprising several light emitting diodes.

12. The method of claim 11, further comprising:
   distorting the continuous image such that on a curved projection surface it appears undistorted; and
   controlling the light-emitting diode arrangement such that a light that is projected by the light-emitting diode arrangement onto the second interior surface merges seamlessly into the continuous image.

13. A non-transitory computer readable medium embodying a computer program product, said computer program product comprising:
   a program, the program configured to:
   project a continuous image onto a first interior surface of an aircraft by means of at least two projectors disposed in a housing; and
   illuminate a second interior surface of the aircraft disposed above the first interior surface by means of a light-emitting diode arrangement comprising several light emitting diodes coupled to the housing.

14. The method of claim 11, wherein illuminating a second interior surface of the aircraft cabin arranged above the first interior surface further comprises:
   illuminating a ceiling of the aircraft with the light-emitting diode arrangement.

* * * * *